(12) United States Patent
Smith

(10) Patent No.: US 6,237,279 B1
(45) Date of Patent: May 29, 2001

(54) LANDSCAPE COVERING DEVICE

(76) Inventor: Jerald H. Smith, 981 Hillside Rd., Hubertus, WI (US) 53033

( * ) Notice: Subject to any disclaimer, the term of this patent is extended or adjusted under 35 U.S.C. 154(b) by 0 days.

(21) Appl. No.: 09/182,320

(22) Filed: Oct. 30, 1998

(51) Int. Cl.[7] ............................. A01G 7/00; A01G 13/00
(52) U.S. Cl. ...................................... 47/9; 47/31
(58) Field of Search ..................... 47/1.01 R, 9, 26, 47/28.1, 31; 52/81.2, 633; 55/494; 249/203

(56) References Cited

U.S. PATENT DOCUMENTS

| | | | |
|---|---|---|---|
| 221,620 | * 11/1879 | Sikes | 47/31 |
| 2,741,874 | * 4/1956 | Denning | 47/28.1 |
| 3,181,273 | * 5/1965 | West et al. | 47/26 |
| 4,062,145 | * 12/1977 | Gidge | 47/9 |
| 4,589,224 | * 5/1986 | Collette | 47/31 |
| 5,176,269 | 1/1993 | Herman | 215/228 |
| 5,213,262 | 5/1993 | Violette | 239/203 |
| 5,274,951 | * 1/1994 | Besing | 47/9 |
| 5,307,588 | * 5/1994 | Ullman | 47/9 |
| 5,323,559 | * 6/1994 | Allman | 47/28.1 |
| 5,526,606 | 6/1996 | Beladakis | 47/33 |
| 5,855,090 | * 1/1999 | Reum, Sr. | 47/9 |

* cited by examiner

*Primary Examiner*—Charles T. Jordan
*Assistant Examiner*—Elizabeth Shaw
(74) *Attorney, Agent, or Firm*—Willis B. Swartwout

(57) ABSTRACT

A frame and structure supported by the frame for the covering and concealing of undesirable objects protruding from the soil when landscaping a rural property where such objects as septic tanks and covers, breathers well caps and buried sprinkler system heads are to be covered. The structure is provided with covering which can be interwoven with real or artificial flora or can be decorative in nature and is constructed from lightweight materials when combined which make the covering readily removable for gardening or lawn mowing purposes.

5 Claims, 2 Drawing Sheets

LANDSCAPE COVERING DEVICE

BACKGROUND OF THE INVENTION

The present invention relates to covering devices and more particularly to outdoor covering devices which may be used in the landscaping field. While the primary use is in the field related, it should be noted that the devices could be used indoors in various utilitarian and decorative ways.

As individuals and families escape the cities and move to the countryside, there is insufficient fully improved lots available in the sizes desired by purchasers. In most states and areas this brings on the necessity of drilling wells for water and providing standard or mound style septic systems for processing sewage. Many of these country homes are very high priced and the result of the aforementioned shortage and requirements results in well caps and septic tank covers and vents protruding up through expensive landscaping and lawns in an undesirable way. Other protrusions such as sprinkler heads from buried systems also are possible.

SUMMARY OF THE INVENTION

The present invention proposes to overcome the problems related in the foregoing material by providing an artificial landscaping device adapted to fit over the well cap, septic system covers, sprinkler heads and vents and look fully natural to an unsuspecting observer by blending into the landscaping.

It is an object of the present invention to provide a device of the character above described, wherein a frame is provided consisting of frame support structure, to which may be affixed a fencing, netting or wall of some type adapted to receive branches of fir trees, plants, real or artificial or the like annexed to the support structure and netting to completely cover the same and hide it from the casual viewer in plain sight, and to be of such variety as to appear totally natural to the environment.

It is another object of the present invention to provide in structure of the character above described a solid frame shaped as a garden or lawn ornament to the viewer but being at least partially hollow or having a recess to receive structure to be hidden from view.

It is still another object of the present invention to provide structure of the character above described wherein the materials used are of a relatively light weight providing easy removal from the covered structure to permit mowing or other work close to the otherwise hidden lawn or garden structure.

It is yet another object of the present invention to provide structure of the character above described wherein covering materials are used representing vegetation which are artificial and retain a living type color never appearing withered.

It is yet a further object of the present invention to provide in a structure of the character above described a frame having an internal shaped portion adapted to cover an exposed pipe, cover or sprinkler head or the like and an external shaped portion of an ornamental nature.

Various other modifications and changes may be made to the structure of the present invention without departing from the spirit thereof or departing from the objects or advantages thereof and they will become apparent as this description proceeds. It is intended that these objects, advantages, modifications and changes be covered by the scope of the appended claims.

DESCRIPTION OF A PREFERRED EMBODIMENT

Figure 1:
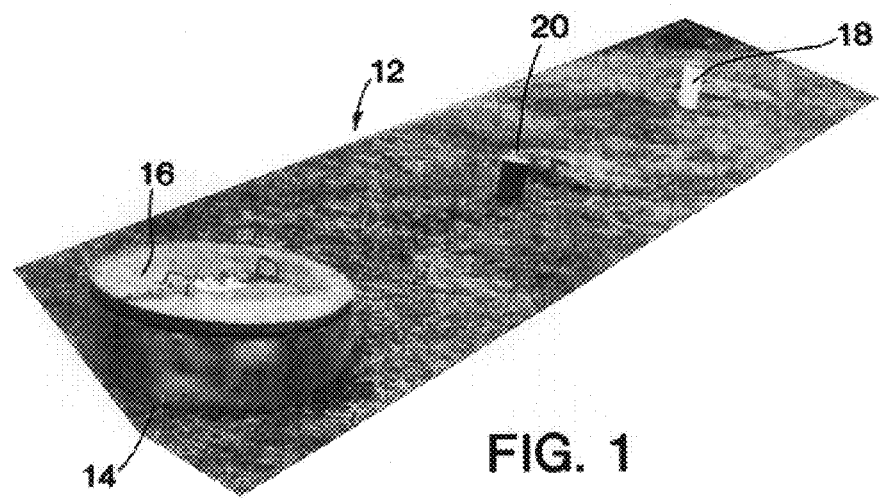
FIG. 1 is an perspective view of a section of a lawn and garden area disclosing various protrusions from the ground surface to be concealed in the landscaping thereof.
Figure 2:
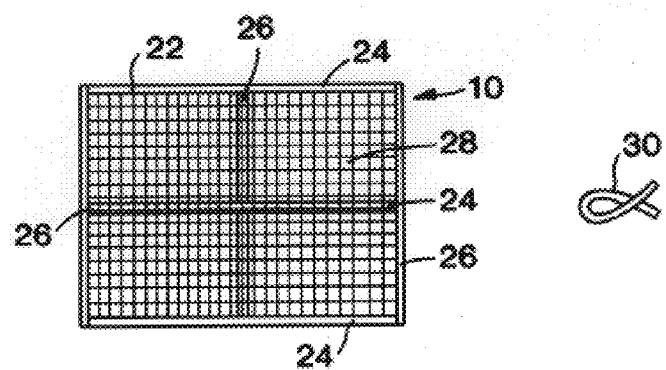
FIG. 2 is a vertical plan view of the structure of one embodiment of the present invention.
Figure 3:
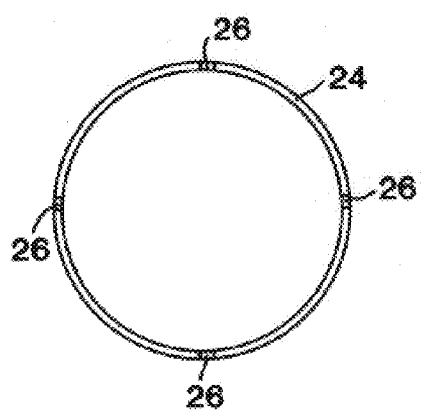
FIG. 3 is a bottom plan view of the embodiment shown in FIG. 2 of the present invention.

Referring now to the drawings and particularly to FIGS. 1, 2 and 3 thereof, an area to be landscaped 12 is disclosed and a covering device is shown and generally identified by the numeral 10 to be used for this purpose.

It should be noted that a land area is disclosed in FIG. 1, generally identified by the numeral 12. In area 12 three different types of protrusions or obstructions are shown including a septic tank 14 and cover 16, a breather 18 and a well cap 20. Other protrusions (not shown) could be a sprinkler head or the like. In the past these structures, when they did exist were usually located in the far reaches of the back yard of a residence, but as population density increases and the demand for suburban type of sub-divisions increases these items often appear in the front lawn area of lots clearly visible to passers-by and visitors.

While the tank 14, cover 16 breather 18 and well cap 20 are shown in FIG. 1 as being in fairly close proximity, this is not always the case. Many times in landscaping property owners or landscape architects will try to hide these items in a garden or behind actual bushes but this complicates cultivating and weeding the gardens and may also create problems with pruning trees or shrubs even on the regular lawn area. The present invention resolves these problems by providing a frame 22, which in the first disclosed embodiment consists of a plurality of annular rings 24 attached in any suitable fashion such as welding to a plurality of upright members 26. By changing the diameters of rings 24 relative to each other one can configure a generally cone shaped structure, or a barrel shaped structure as desired depending on what the frame 22 is to end up representing. In the disclosed embodiment frame 22 has rings 24 of equal diameter which will result in a generally cylindrical frame shape. The rings 24 may be altered in such a fashion as to be of any desired geometric configuration such as a square, rectangle or other shape.

In the preferred embodiment disclosed in FIGS. 2 and 3, a screen or lattice 28 preferably made from fencing or wire is attached to the frame 22 at the annular rings 24 and upright members 26 with wire twists 30 or other suitable fasteners creating a structure to which may be attached by interweaving them into the mesh created real or artificial fir boughs 32 of any particular kind. Other type of shrubbery either real or artificial may be substituted for the fir boughs 32, however it is important to use artificial to prevent a withered appearance.

Figure 5:
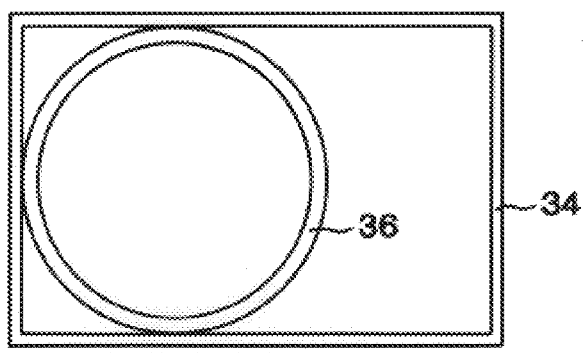
FIG. 5 is a bottom plan view of the structure shown in FIG. 4.
Figure 4:
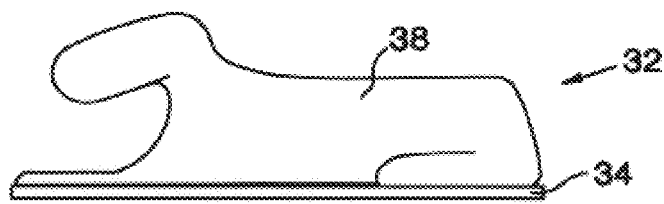
FIG. 4 is a vertical plan view of a variation of the present invention taken from the side.
Figure 6:
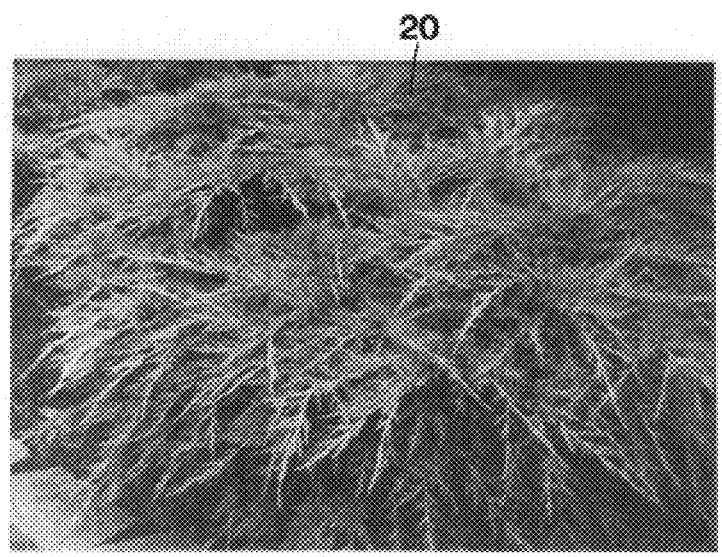
FIG. 6 is an external view of the structure shown in FIGS. 2 and 3, showing the covered structure in dotted line.

Referring now to FIGS. 4 and 5 of the drawings a second embodiment of the invention generally identified by the numeral 32 is disclosed having a frame 34. In this case the frame 34 as viewed in FIG. 4 can be seen to be generally a rectangular in vertical plan and circumscribing a circular cover member 36. In this case frame 32 may be made of wood, metal or other suitable material and supports an animal 38 which is strictly for decorative purposes, but the recess defined by member 36 is sufficient to cover a proposed septic tank cover 16, sprinkler head, well cap 20 or vent 18. While it is not required, the opening to receive the object to be covered in any of the embodiments may closely circumscribe the item to be covered making loss due to theft or blowing away less likely. Also, the general weight of the landscaping device generally holds it in place and at the same time permits easy removal so that one may mow, weed or cultivate right up to the structure being secreted. A reference to FIG. 6 will show generally how this is accomplished.

It is quite clear from the disclosures that various flora supporting structure as well as decorative structure may be used to conceal various items and accomplish the landscaping purpose. It can now be seen that the disclosure accomplishes all objects and advantages recited and it is intended that they be covered in the scope of the appended claims.

I claim:

1. A landscaping device for covering undesirable objects from view including:

a) a frame of a specific artistic shape;

b) said frame including a plurality of horizontal and vertical members, said members being connected and said vertical and horizontal members being interconnected such that a plane is formed for said frame to rest upon the ground; and c) a covering means connected to said frame and adapted to permanently receive in interweaving fashion artificial flora to form a recess to receive and conceal an undesirable object from public view.

2. The structure as set forth in claim 1, wherein said adapting mesh is coupled to said frame and adapted to receive said flora in interweaving fashion.

3. The structure as set forth in claim 1, wherein the frame structure is adapted to be changed in geometric dimension to alter the ultimate shape of the device as desired.

4. The structure as set forth in claim 1, wherein the frame is adapted to support a decorative covering.

5. The structure as set forth in claim 1, wherein the combined weight of all materials creates an easily liftable and removable device.

\* \* \* \* \*